Jan. 18, 1938.  T. ZIMMERMAN  2,105,762
MACHINE FOR HONING CONICAL SURFACES
Filed Dec. 5, 1935  5 Sheets-Sheet 1

INVENTOR.
Thomas Zimmerman,
BY
ATTORNEYS

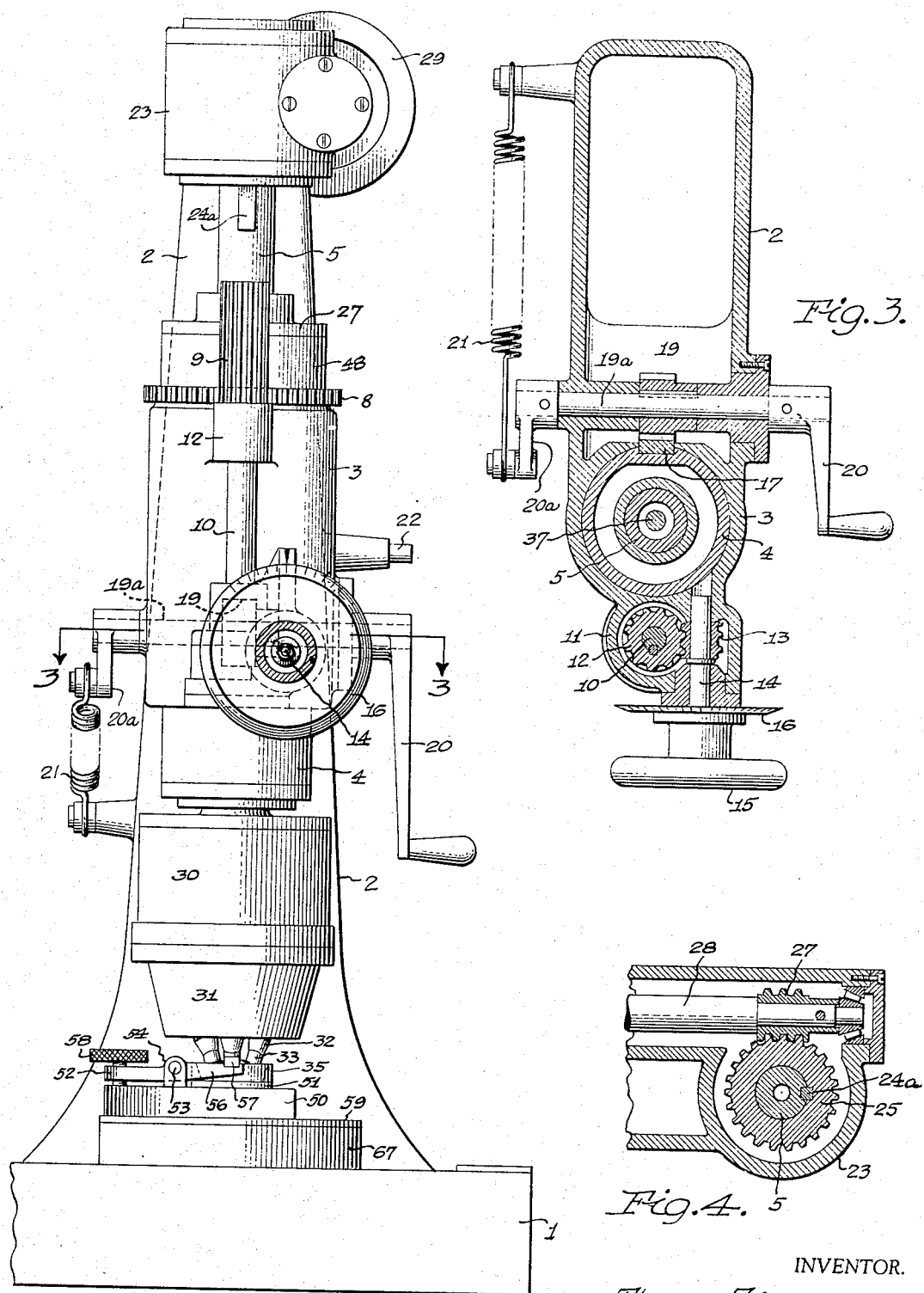

Jan. 18, 1938.　　　　T. ZIMMERMAN　　　　2,105,762
MACHINE FOR HONING CONICAL SURFACES
Filed Dec. 5, 1935　　　5 Sheets-Sheet 3
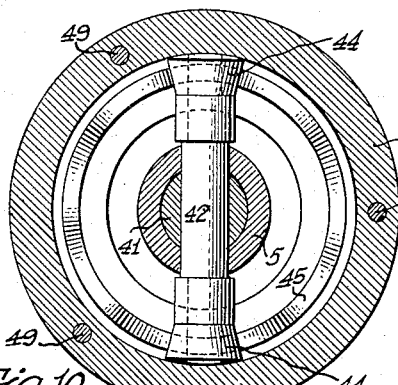
Fig. 10.
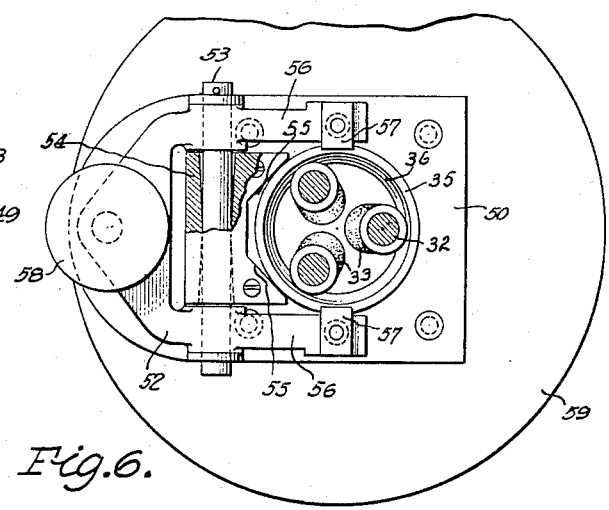
Fig. 6.
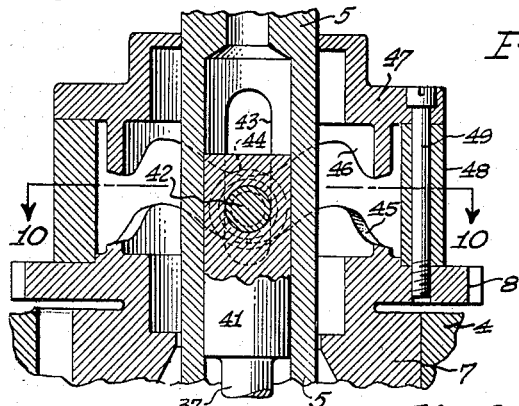
Fig. 9.
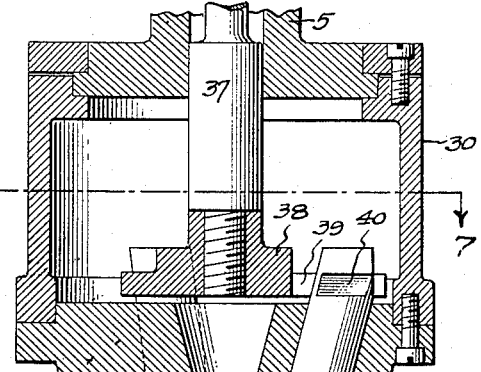
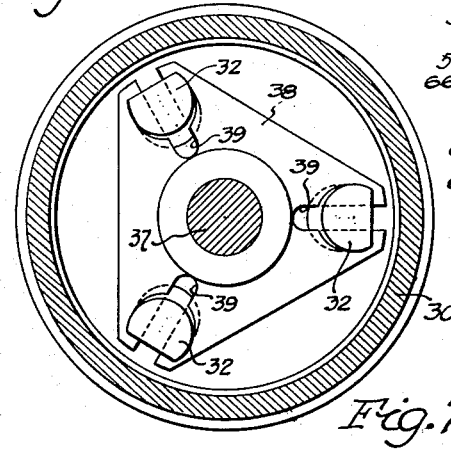
Fig. 8.
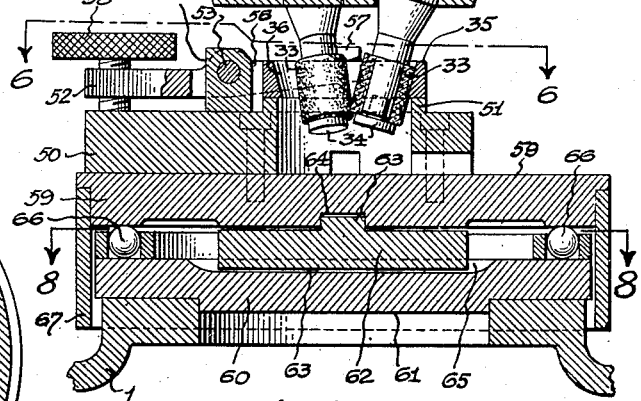
Fig. 5.
Fig. 7.
INVENTOR.
Thomas Zimmerman,
BY
ATTORNEYS Jan. 18, 1938.  T. ZIMMERMAN  2,105,762
MACHINE FOR HONING CONICAL SURFACES
Filed Dec. 5, 1935  5 Sheets-Sheet 4
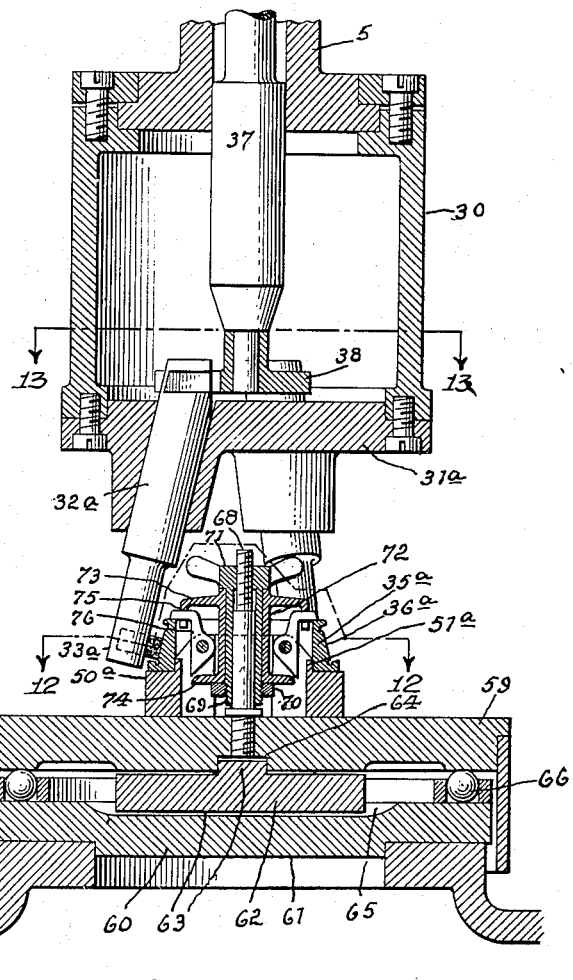
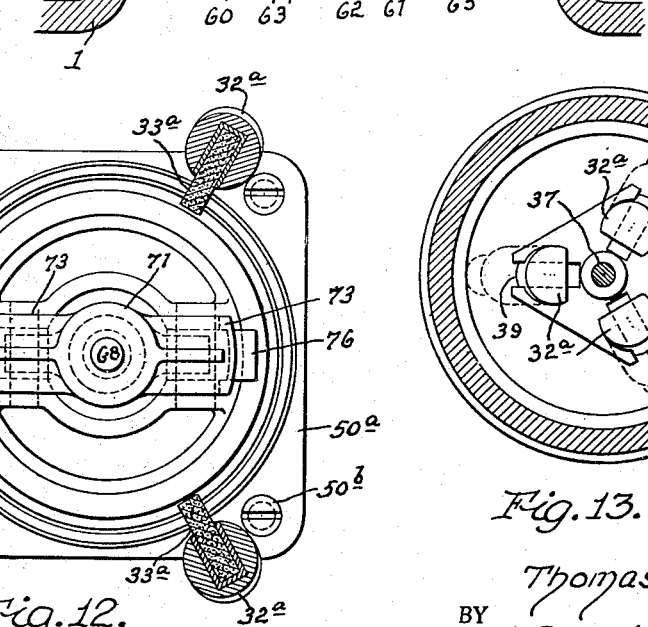
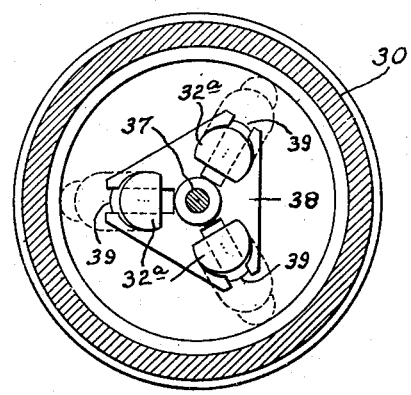
INVENTOR.
Thomas Zimmerman.
BY
ATTORNEYS Jan. 18, 1938.　　　　　T. ZIMMERMAN　　　　　2,105,762
MACHINE FOR HONING CONICAL SURFACES
Filed Dec. 5, 1935　　　　5 Sheets-Sheet 5

Thomas Zimmerman, INVENTOR

BY

ATTORNEYS

Patented Jan. 18, 1938

2,105,762

UNITED STATES PATENT OFFICE 2,105,762

MACHINE FOR HONING CONICAL SURFACES

Thomas Zimmerman, Detroit, Mich., assignor to Bower Roller Bearing Company, Detroit, Mich., a corporation of Michigan Application December 5, 1935, Serial No. 52,976

21 Claims. (Cl. 51—31)

This invention relates to a method and means for finishing the conical tapering surface of circular members, and more particularly to a method and machine for honing the conical surface of tapered roller bearing members.

An object of the present invention is to provide a method of and means for very accurately honing or forming the conical surface of a bearing member with the desired exact taper and uniform surface in the direction of both its width and length, and to provide for the accurate, automatic centering of the work and finishing instrumentalities. It is also an object to maintain accuracy by providing for disintegration or wearing away of the finishing or honing members and for maintaining said members with a true uniform surface throughout their length.

A further object is to vary the path of travel of the hone or hones in contact with the work surface, so that no point on the contact surface of said hone or hones will follow the same path of travel during succeeding travel periods and thereby cause slight irregularities to be formed on the work surface.

These and other objects are attained through the provision of a machine having what may be termed a non-rotatable floating work holder and a rotatable and reciprocable finishing-member carrier to advance said member and rapidly rotate the same in contact with the conical surface of the work, and to simultaneously reciprocate such member across the conical surface of the work in contact therewith, such reciprocation being in a plane exactly parallel with the plane of the desired inclination of the conical surface of the work, and of uniform speed of travel throughout the entire length of reciprocation, means being provided to vary the path of travel of said member.

The attainment of the above objects is further promoted by providing a machine having a head in which a plurality of spindles is mounted for longitudinal reciprocation, each spindle having a honing or finishing member mounted upon the projecting end thereof with the longitudinal axis of each spindle and member set at an inclination to the axis of rotation of the head, which inclination corresponds exactly to the inclination of the conical surface of the work to its axis, and these finishing members thus, by their convergent relation, together forming a conical abrading or honing device to engage the work and by engagement with the conical surface thereof, center the work with the said axis of the head.

A further object of the present invention is to provide a machine for carrying out the present method of finishing tapered roller bearing members, which machine is simple in construction, efficient in operation and embodies certain other new and useful features, all as hereinafter described and illustrated in the accompanying drawings wherein;

Fig. 2 is a front end elevation of Fig. 1;

Fig. 3 is a horizontal section substantially upon the line 3—3 of Fig. 2;

Fig. 4 is a sectional detail upon the line 4—4 of Fig. 1;

Fig. 5 is an enlarged vertical section upon the line 5—5 of Fig. 1;

Fig. 6 is a horizontal section upon the line 6—6 of Fig. 5;

Fig. 7 is a section upon the line 7—7 of Fig. 5;

Fig. 8 is a reduced section upon the line 8—8 of Fig. 5;

Fig. 9 is an enlarged section upon the line 9—9 of Fig. 1;

Fig. 10 is a section upon the line 10—10 of Fig. 9;

Fig. 11 is an enlarged vertical section similar to that of Fig. 5 and showing a modified construction adapted for honing the outside conical surface of roller bearing cones;

Fig. 12 is a transverse section substantially upon the line 12—12 of Fig. 11;

Fig. 13 is a transverse section substantially upon the line 13—13 of Fig. 11;

Figure 1:
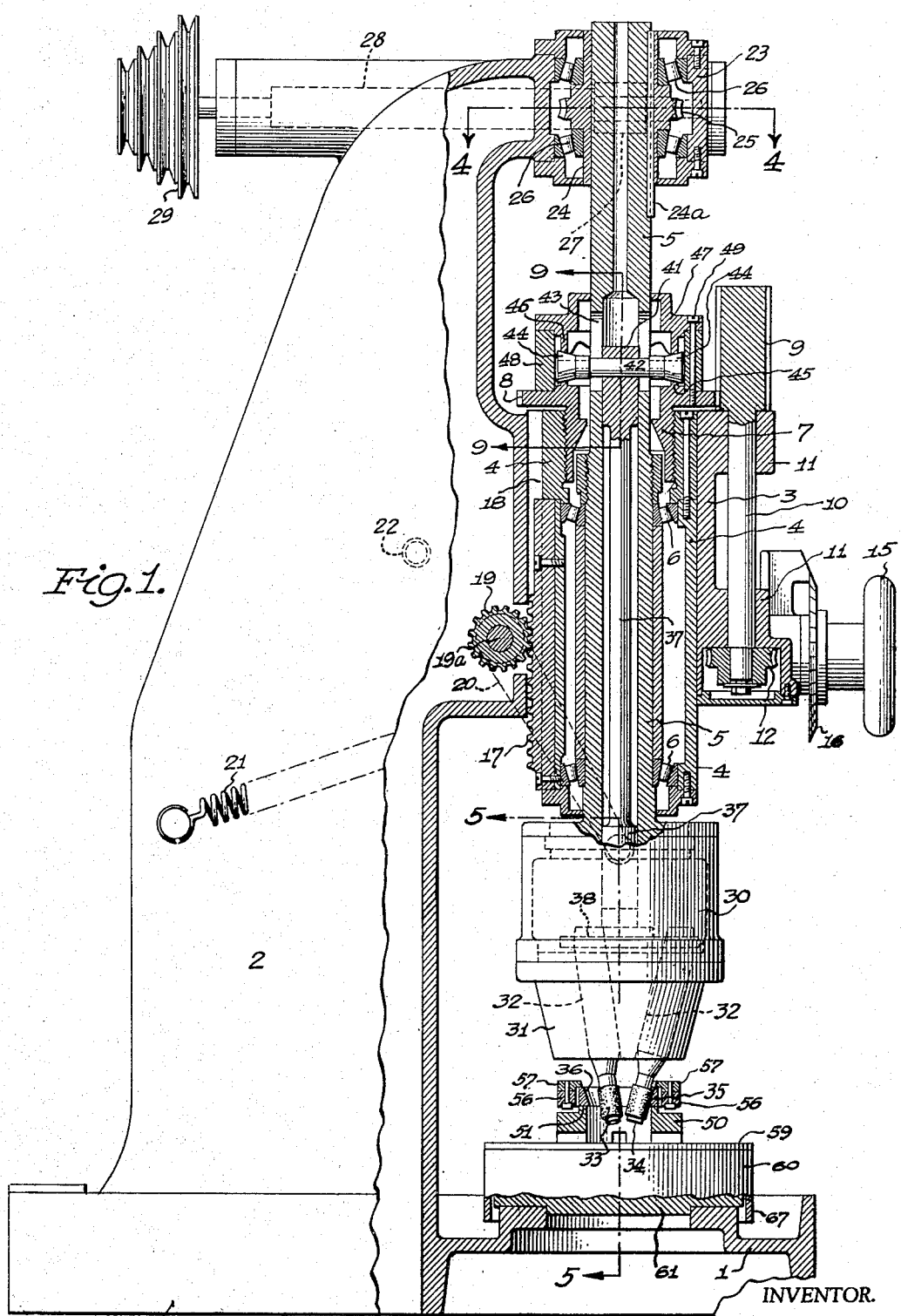
Figure 1 is a vertical axial section, with parts in side elevation, of a machine illustrative of means for carrying out the present method and illustrative of an embodiment of the invention.

In the accompanying drawings Figs. 1 to 10 inclusive, a machine illustrative of an embodiment of the present invention and means for carrying out the method of honing annular roller bearing cups is shown, and in the several figures I indicates a suitable base for the machine provided with a central upstanding pedestal 2, which pedestal is formed with a laterally extending bearing bracket 3 provided with a vertical bore in which a tubular adjusting member 4 is mounted for longitudinal movement and is held against rotation. Within this adjusting member 4 is mounted a tubular spindle 5 within roller bearings 6 interposed between the spindle and adjusting member. The upper end of the tubular member 4 is internally screwthreaded to receive an adjusting nut 7 and the upper end of this nut is formed or provided with a spur gear 8 which is in mesh with an elongated pinion 9 upon the upper end of a shaft 10 mounted in bearing lugs 11 projecting from the side of the bracket 3. On the lower end of the shaft 10 is secured a worm gear 12 and this gear is in mesh with a worm 13 secured on a shaft or spindle 14 which is provided upon its projecting end with a hand wheel 15 by means of which the worm and worm wheel may be turned by hand to adjust the nut 7 longitudinally within the tubular adjusting member 4. Upon the outer end of the shaft 14 is an indexing disk 16 to indicate to the operator the amount of adjustment given the nut 7.

Secured to the tubular adjusting member or sleeve 4, is a longitudinal rack 17 and this rack is movable with the adjusting sleeve within a groove or way 18 on the side of the bore of the bracket 3 in which bore the adjusting sleeve is movable longitudinally, the rack bar thus preventing rotation of the adjusting sleeve, and a pinion 19 is in mesh with the rack 17 and is secured upon a transverse shaft 19a mounted in bearings in the bracket 3 and provided at one end with a crank handle 20 and at its opposite end with a crank 20a to which a coiled spring 21 is attached at one end, the opposite end of the spring being anchored in any suitable manner to the standard or pedestal 2 outside thereof.

Projecting from the opposite side of the pedestal 2 is a stop member 22 so positioned relative to the axis of the shaft 19a that when the handle 20 is thrown upwardly and past the shaft center, the spring 21 acting upon the crank 20a will hold the handle in contact with the stop so that the weight of the tubular adjusting sleeve 4 and mechanism carried thereby will not move said sleeve and mechanism downwardly but the handle and stop will serve as a lock to hold the sleeve in elevated position. When the handle is turned away from the stop to a downwardly extending position, the spring then acts upon the handle to rotate the gear 19 and move the adjusting sleeve 4 downwardly, the weight of the sleeve and mechanism carried thereby also tending to move the sleeve downwardly.

Mounted upon the upper end of the pedestal 2 and extending laterally therefrom, is a bearing box 23 provided with conical roller bearings 26 interposed between the side walls of the box and a sleeve 24 which is slidable upon the upper end of the tubular spindle 5 and is connected thereto to rotate therewith, by means of a spline 24a, this sleeve 24 being formed integral with a worm gear 25 within the bearing box and within a side projection of this box is mounted a shaft 28 provided with a worm 27 to engage the worm wheel 25 and upon the opposite end of this shaft 28 is secured a multiple pulley 29 by means of which the worm wheel 25 is rotated and thus rotates the spindle 5, the pulley preferably being provided with a plurality of grooves to receive a belt, these grooves being of different diameters to give different speeds, the belt and means for driving the same not being shown in the drawings.

Formed integral with or rigidly secured to the lower end of the tubular spindle 5, which end projects from the lower end of the adjusting sleeve 4, is a head indicated as a whole by the numeral 30, and which head comprises a suitable cylindrical casing to the lower end of which is rigidly secured a conical end member 31 formed with a plurality of bores within which spindles 32 are mounted for longitudinal reciprocation, the longitudinal axis of each of these spindles extending at an inclination to the vertical axis of the head and the several spindles extending in a downwardly convergent relation.

Secured upon the reduced lower projecting end of each of these spindles 32 is an abrading or honing sleeve 33 held in place by means of a headed tap screw 34 tapped into the lower end of the spindle with its head engaging the lower end of the sleeve and with the upper end of the sleeve engaging a shoulder formed on the spindle. These honing or abrading members 33 are thus carried by the several spindles and together form in effect, a honing device of conical form which is adapted to enter the annular work member 35 which, as shown, is a cup of a tapered roller bearing and has an internal conical surface 36. The several spindles 32 are so set or mounted in the conical lower end 31 of the head that the longitudinal axis of each spindle extends in a plane exactly parallel to the inclined plane of the conical surface 36 of the work and as the several honing sleeves 33 together form, in effect, a conical honing device, when the head 30 is lowered to project this honing instrumentality into the annular work member, the several honing sleeves will be brought into exact even contact with the conical surface of the work to be honed and when the head 30 is rapidly rotated by power applied by means of the pulley 29 to the shaft 28 and thence through the gears 25 and 27 to the tubular spindle 5, while the spindles 32 are not individually rotatable, they, as a unit structure will be rotated about the vertical axis of the head within the annular work member and as each spindle 32 is set at an inclination exactly corresponding with the taper or conical surface of the work, these honing members will burnish or hone this conical surface with the exact desired conical inclination as they are rapidly rotated about the vertical axis of the head.

In order to give a better honing effect to the inside conical surface of the work, it is preferable that the several spindles 32 be moved or reciprocated longitudinally simultaneously with the rotation of the head with the honing sleeves in contact with the work so that these sleeves will no only be carried around in contact with the conical surface of the work in the direction of its length but will also be reciprocated across this surface to give a perfectly even smooth surface and a perfect and accurate internal conical surface to the bearing cup operated upon. This longitudinal movement of the honing members also tends to maintain the surface of these members even and of uniform diameter throughout their length as this surface wears away in use.

To impart a longitudinal movement to the several spindles 32, a reciprocable shaft 37 is mounted within the tubular spindle 5, the ends of the shaft being enlarged to fit within the bore of the spindle and to connect the lower end of this shaft 37 to the ends of the several spindles 32 which project into the chamber of the head 30, a plate 38 is secured in any suitable manner to the lower end of the shaft 37 and this plate is provided with radial slots 39 to receive the neck portions of the spindles, which portions are formed by notching or slotting the sides of each spindle, as at 40, so that as the shaft 37 is moved upwardly, carrying the plate 38 with it, the spindles 32 will be moved endwise in their bearings in the conical end 31 of the head due to such engagement of the plate with the neck portions of the spindles, and as these spindles are inclined outwardly and upwardly, due to such inclination, their upper ends will move outwardly and such movement is permitted by the radial slots in the plate.

To impart a reciprocating motion to the shaft 37, the head 41 or enlarged end of the shaft, is bored transversely to receive a transverse shaft 42 which extends through longitudinal slots or openings 43 in the sides of the tubular spindle 5 and mounted for free rotation upon the ends of this shaft 42 are conical rollers 44 to rest upon an upstanding flange 45 on the gear 8 or upper end of the adjusting sleeve 4, a like flange 46 being provided upon a cap 47 which is accurately spaced from the gear 8 by an interposed ring 48, said ring and cap forming the sides and end of a casing or cam chamber by securing the cap and ring to the gear by means of bolts 49, the gear 8 forming the bottom of such chamber and these flanges 45 and 46 are formed with undulating curved edge surfaces of mating formation, thus providing between these surfaces a way or slot of undulating form within which the conical rolls 44 travel. The undulations of this slot or track for the rolls are exactly uniform with the high spots of the lower flange exactly opposite the low spots of the upper flange said flanges together forming what is known as a harmonic cam, and, therefore, as the rolls roll along this track as the spindle 5 is rotated, the shaft 37 will be reciprocated within this hollow spindle with an even motion, that is, the speed of travel of the shaft endwise will be exactly the same throughout the entire length of its reciprocation and this constant even travel of reciprocation across the conical surface of the work, of the honing sleeves or members 33, thus giving a better honing action than would be secured if the hones were reciprocated across the face of the work with an uneven speed.

The work or annular bearing member 35 is held in position to be engaged internally by the hones 33, by providing a seat block 50 with an upstanding flange 51 forming a seat for the lower edge of the ring and by holding the ring accurately seated thereon by means of a holding fork 52 which is pivotally attached to the seat block 50 by providing a pivot block 54 secured on the seat block to receive a pivot shaft or pin 53 passing therethrough and through the side arms 56 of the fork, these side arms being provided with lugs 57 at their free ends to engage over the upper edge of the work ring and hold it down upon its seat 51 by forcing the arms toward the work by means of a set screw 58 passing through a screwthreaded opening in the tail portion of the fork and engaging the upper side of the block 50. The work ring 35 is centered laterally between the arms 56 of the fork by means of inwardly inclined surfaces 55 on the pivot block 54 to receive the work therebetween and accurately center it between the arms 56, the bore of the block 54 through which the pin 53 extends, being formed tapering toward each end and accurately fitting the diameter of the pin intermediate the ends of the bore so that said pin may have a slight tilting motion within the bore of the block.

The seat block 50 is secured in any suitable manner upon the upper side of an upper circular table or disk 59 and mounted upon the base 1 beneath the table 59 is a lower disk or table 60 which has a central circular boss 61 on its lower side to fit closely within an opening in the base 1. The upper and lower tables are spaced apart and interposed therebetween in a spline block preferably of circular form having a rib 63 on its lower side extending diametrically thereacross to engage within a groove 65 in the upper side of the lower table 60 and this spline block also has a like rib extending diametrically across its upper side at right angles to the rib on its lower side and this upper rib engages within a groove 64 in the lower side of the table 59. A ring flange 67 carried by the upper table 59 extends downwardly to enclose the lower table and also to enclose a ball bearing ring 66 which is interposed between the upper and lower tables adjacent their peripheries. The upper table 59 which carries the seat block 50, has, therefore, a free movement laterally of the lower table in the directions of the length of either of the ribs 63, and therefore, the upper table carrying the work has a limited non-rotative centering movement so that the work will be accurately centered relative to the vertical axis of the head 30 when this head is lowered, bringing the hones into engagement with the conical surface of the work. The work is therefore accurately and automatically centered by the bringing of the hones into engagement with the work, these hones together providing a conical formation to enter the work ring and by its engagement within the interior of the ring, moving the table 59 to accurately center the axis of the work with the vertical longitudinal axis of the head 30. Very accurate centering is therefore secured and greater accuracy of honing attained thereby, and by employing a plurality of these hones which are cylindrical in form, a plurality of spaced apart lines of contact with the work is provided, which contact is automatically maintained and regulated by gravity, which may be aided if so desired, by the spring 21, the weight of the head 30 and attached parts serving to move said head downwardly, projecting the hones farther and farther into the annular work.

In Figs. 11 to 13 inclusive, a modified construction is shown whereby the machine may be employed to hone the outside conical surfaces of members, such as the inside cone members of tapered roller bearings, the modification consisting mainly in mounting the spindles 32a which correspond to the spindles 32, in the end member 31a of the head 30 at an outwardly and downwardly inclined position to receive between their lower ends which carry hones, the work 35a which, as shown, consists of an annular bearing cone having an outside conical surface 36a. The hones may be cylindrical as indicated at 33 in the previously described construction or may be thin flat pieces 33a secured within openings in said spindles near their lower ends to project laterally therefrom and engage the conical surface 36a of the work, preferably with substantially a line contact, the edge surface of each member being at substantially right angles to its side surface and contacting the curved conical surface of the work along a central line of said edge. However, the contact edge of each hone may be otherwise formed to give a narrow surface contact as desired and the length of each hone longitudinally of its carrying spindle may be varied to suit the conditions of use, as where the surface to be honed is narrow, this length will be shortened to provide for endwise movement of these hones between the usual end flanges or shoulders on a bearing cone of the usual construction, it being most desirable to move the hones transversely of the width of the conical surface while being rotated about the axis of rotation of the head 30 in contact with the work.

The same means for so reciprocating the hones and spindles, including the slotted plate 36 and reciprocable shaft 37 is employed as in the previously described construction, and substantially the same work supporting and centering means including the seat block 50a secured by the bolts 50b to the upper table 59 is used, said seat block 50a being formed with an upstanding flange 51a to engage within the diameter of the work cone 35a, and hold it centered upon said block, different holding means being provided however for clamping the work seated, said holding means comprising a central stud 68 rigidly secured at its lower end within an axial opening in the upper table 59 and on this stud is a sleeve 69 screw-threaded at its lower end to receive a nut 70 and formed at its upper end with a wing nut 71 internally screwthreaded to engage the reduced and screwthreaded upper end of said stud 68. Sleeved upon said sleeve 69 between said nuts 70 and 71 is a spool 72 having upper and lower outstanding flanges 73—74 respectively, said upper flange 73 being formed with a downturned peripheral flange 75 formed with notches through which the outwardly projecting arms of a plurality of dogs 76 extend to engage the upper end surface of the work 36a, said dogs being pivotally attached intermediate their ends to the spool 72 intermediate the flanges 73, 74, and the lower end or tail of each of these dogs is adapted to be engaged by the lower flange 74 to swing these dogs inwardly and disengage their arms on their upper ends from over the work when said spool is moved upwardly by the unscrewing of the nut 71. By screwing said nut 71 down upon the stud 68, the spool is moved downwardly, bringing its flange 75 into engagement with the arms of said dogs, turning them outwardly and over the upper end of the work and then forcing them down into firm clamping engagement with the work to hold it firmly seated upon the seat block 50a.

In this modified construction, by reason of the inclined divergent relation of the spindles 32a, upon the lowering of the head 30, they encircle the work cone and when the hones come into contact with the outer conical surface thereof, the work is automatically and accurately centered with the axis of rotation of the head and about which axis the several hones rotate, and as the several spindles are reciprocated longitudinally during such rotation, the surface of the cone is accurately formed both longitudinally and transversely throughout its entire width and is also formed at the exact desired angle of inclination.

Figure 14:
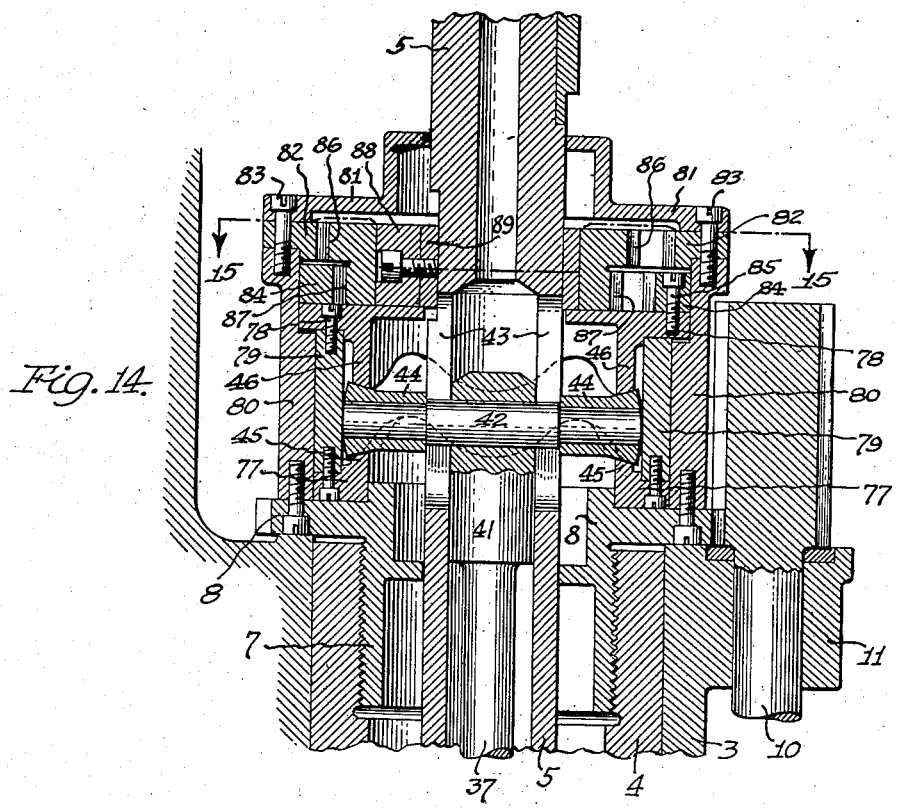
Fig. 14 is a vertical sectional detail similar to that of Fig. 9, and showing a modified construction.
Figure 15:
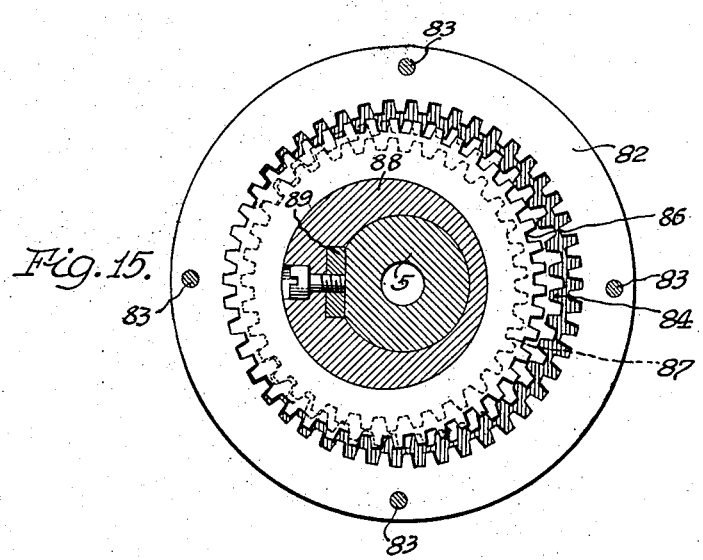
Fig. 15 is a transverse section substantially upon the line 15—15 of Fig. 14.

The modification shown in Figs. 14-15 is illustrative of means for changing the path of travel of the hones in contact with the work, so that no point on the surface of the hone or hones will follow the same path during succeeding rotations of the hones about the axis of the work in contact therewith, that is, instead of the hone or hones being reciprocated by the harmonic cam in the same timed relation to the rotation of the hones about the axis of the work during succeeding rotations, because the said cam is held against rotation as in Figs. 1 and 9, this timed relation is changed during rotation so that the path defined during one rotation about the work axis will be different from that defined during the succeeding rotation, and therefore marks or slight deformations of the work surface caused by repeated honing in the same path, are avoided. This is accomplished by effecting a differential rotation of said harmonic cam and hones upon the same axis.

In the construction shown in Figs. 1 and 9, the harmonic cam comprising the opposed and spaced apart flanges 45—46 is secured to the spur gear 8 which is held against rotation except for the purpose of adjusting the tubular member 4 longitudinally, but in the construction shown in Fig. 14 this cam is rotatable about the axis of the spindle 5 by being mounted upon said gear 8 for rotation relative thereto effected by differential gearing driven by said spindle and driving said cam assembly.

The harmonic cam assembly comprises a lower ring member 77 seated upon the gear 8 for free rotation thereon, said ring being formed with the cam flange 45, and an upper ring member 78 formed with the cam flange 46, said ring members being rigidly connected for simultaneous rotation by a ring sleeve 79 similar to the ring 48 shown in Fig. 1. To inclose this cam assembly and guide and center the same, a tubular member 80 forming a casing wall is rigidly secured at its lower end to said gear 8 and a cap 81 forming the upper end of said casing is bolted to the upper end of said wall 80 with the peripheral portion of a fixed internal ring gear 82 interposed between wall and cap by the same bolts 83 which secure said cap to said wall. An internal ring gear 84 is secured by bolts 85 to the upper side of the member 78 at its periphery and in mesh with these ring gears 82—84 is a double internal ring gear member forming a gear 86 having peripheral teeth to mesh with the teeth of the fixed ring gear 82 and a gear 87 to mesh with the gear 84, each of these gears 86—87 being of less diameter than the internal diameter of gears 82—84, and the double gear member formed of gears 86—87 is mounted upon an eccentric 88 secured in any suitable manner, as by a spline block 89, to the spindle 5 to turn therewith, said eccentric being of a diameter to fit the internal diameter of said double ring gear member and turn therein, thus holding the gear 86 in mesh with the fixed gear 82, and the gear 87 in mesh with the gear 84 which is secured to the member 78 of the harmonic cam to rotate the same in timed relation to the rotation of the spindle 5 and reciprocation of the shaft 37 caused by the engagement of the rolls 44 between the cam surfaces of the flanges 45—46. Thus the cam 88 driven by said spindle, rolls the gear 86 around in mesh with the fixed gear 82, imparting rotation to the gear 87 which in turn rotates the gear 84 and the cam assembly with a slow motion, so that the relation of said cam to the rotation of said spindle 5 and hone carrying head 30 is constantly changed to vary the paths of reciprocation of the hones in contact with the conical work surface as said hones are rotated about the axis of said surface in contact with said surface.

Therefore this differential gearing which is interposed between spindle and harmonic cam, advances said cam slowly, changing the position of the cam surfaces to the rolls 44 engaged thereby and slowly advancing the paths of reciprocation of the hones in contact with the work surface to cause said paths to overlap so that these hones will not follow the same paths during succeeding rotations, thus avoiding scoring or forming slight unevenness of the honed surface which would be the result of the hones following the same paths during succeeding rotation of the hones about the work axis in contact with the work.

The invention as herein presented, not only includes the method of honing which comprises rotating a plurality of hones about a common center with each hone contacting with the work along a line extending transversely of the conical surface of the work and inclined to conform to the inclination of the conical surface of the work, rotating said hones about said center while in contact with the work, and reciprocating said hones in the direction of the length of their lines of contact while being rotated about said common center; but also includes the machine shown as illustrative of one means for effectively employing such method in the manufacture of articles of the class described. Obviously, other means than the particular machine shown may be employed and this particular construction of machine may be varied without departing from the spirit of the invention, and such changes are contemplated.

Having thus fully described my invention, what I claim is:—

1. The method of finishing the circular conical surface of a member, which method consists in rotating a finishing instrumentality about an axis coincident with the axis of the work and in contact with the conical surface of the work along a line or lines extending transversely of said surface and in contact therewith throughout the width thereof, and simultaneously moving said instrumentality in the direction of the length of said line or lines of contact with an advancing rotative movement to vary the path of travel of said instrumentality during succeeding rotations.

2. The method of finishing the conical surface of a bearing member, which method consists in rotating a finishing instrumentality about a vertical axis with the work contacting surface of said instrumentality inclined to its axis of rotation corresponding to the inclination of said conical surface of the work to its axis, bringing said instrumentality into contact with said conical surface along a plurality of lines to center the work with its axis coincident with said axis of rotation, and reciprocating said instrumentality in the direction of the length of said lines with an advancing rotative movement to vary the paths of travel of said instrumentality in a horizontal direction during rotation.

3. The method of finishing the conical surface of a bearing member, which method consists in supporting the work in a manner to permit the work to move laterally, in rotating a finishing instrumentality including a plurality of members to engage the work surface along separate lines extending transversely of the conical surface of the work and inclined to the axis of rotation of said instrumentality to correspond with the inclination of the conical surface of the work, reciprocating said members of the instrumentality in the direction of the length of their said lines of contact and during the rotation of said instrumentality while in contact with the work, and varying the speed of reciprocation of said members relative to the speed of rotation of said instrumentality for varying laterally the paths of travel of said members during rotation of said instrumentality.

4. The method of finishing the conical surface of a bearing member which consists in rotating a plurality of finishing members about a common axis with said members in contact with the conical surface of the work along separate lines inclined to the axis of rotation and corresponding in inclination to the inclination of the conical surface of the work to the axis thereof, moving said finishing members simultaneously into contact with the conical surface of the work to center the work relative to the common axis of rotation of said members, reciprocating said members in the direction of the length of their lines of contact with the work, during the rotation thereof about said common axis, and simultaneously advancing said members in the direction of their rotation about their common axis to vary the paths of travel of said members laterally during succeeding rotations.

5. The method of finishing the interior conical surface of an annular bearing member which consists in rotating a finishing instrumentality comprising a plurality of cylindrical finishing members about a common axis with each of said members in line contact with the conical surface of the work and with each line of contact extending transversely of said conical surface and inclined to said axis of rotation at an inclination corresponding to the inclination of the conical surface of the work, and simultaneously with such rotation and in timed relation thereto, reciprocating said members in the direction of the length of their lines of contact with the work, and varying their paths of travel in contact with said conical surface longitudinally thereof, during succeeding rotations by a differential rotation of said members about said axis.

6. Means for finishing conical circular surfaces, said means including a plurality of finishing members rotatable about a common axis coincident with the axis of the circular conical surface of the work and each member inclined to said axis to a degree equal to the degree of angle of the conical work surface to its axis to contact said surface throughout the width thereof and at right angles to the length of said surface, rotative means for reciprocating said members in the direction of the length of their lines of contact with said conical surface and transversely thereof, and differential means driven by said rotative means for effecting relative rotation of said rotative means and said members about said common axis of rotation to change the paths of travel of said members during succeeding rotations.

7. In a device for the purpose described, the combination of a head, cylindrical finishing members carried by said head and adapted to contact the conical surface of the work along separate lines extending transversely of said surface and in contact therewith throughout the width of said surface, rotative means for moving said members relative to said head in the direction of the length of their lines of contact with said conical surface of the work during rotation of said head, and means driven by said rotative means for rotating at different relative speeds, said head, and said rotative means for moving said members to vary the path of travel of said members in contact with the work during the succeeding rotations.

8. In a machine for the purpose described, the combination of a rotatable spindle, means for rotating said spindle, a head on said spindle, a plurality of finishing members disposed in convergent relation about the axis of said spindle and carried by said head, means for adjusting said spindle longitudinally, means movable longitudinally of said spindle for moving said finishing members relative to said head during rotation of said spindle, and means for locating the work relative to said finishing members and providing universal movement thereof in a plane transverse to the axis of the spindle to permit said work to be engaged and centered by said finishing members.

9. In a machine for the purpose described, the combination of a pedestal having a laterally extending bearing bracket, a vertical spindle mounted in said bracket for longitudinal and rotative movement therein, a head on the lower end of said spindle, a plurality of finishing members carried by said head and inclined to the axis thereof, means for moving said spindle and head to bring said finishing members into contact with the conical surface of the work, means for rotating said spindle, and rotative means actuated by the rotation of said spindle for moving said finishing members relative to said head in the direction of the length of their lines of contact with the conical surface of the work and differential gearing driven by said spindle and operative to rotate said head at a speed different from the speed of rotation of said spindle to change the position of said finishing members relative to said spindle in the direction of rotation thereof.

10. In a machine for the purpose described, the combination of a pedestal having a laterally extending bracket, a sleeve non-rotatively mounted in said bracket, a tubular spindle mounted in said sleeve, a head on said spindle, means for adjusting said sleeve relative to said tubular spindle, a shaft within said tubular spindle, a plurality of finishing members carried by said head and operatively connected to said shaft, and means for moving said shaft longitudinally to move said finishing members in the direction of the length of their lines of contact with the work, and means for rotating said spindle and head to rotate said finishing members in contact with the work about the vertical axis of said head and spindle.

11. In a machine for the purpose described, the combination of a base, means on said base for supporting the work and permitting lateral centering movement of the work, a pedestal on the base having a laterally extending bracket, a sleeve mounted in a bore of the bracket for non-rotative longitudinal movement therein, a nut in screwthreaded engagement with the upper end of said sleeve, means for adjusting said nut to adjust the position of the sleeve within said bracket, a hollow spindle mounted within said sleeve for rotative movement therein, a head on the lower end of said hollow spindle, finishing members carried by said head for engagement with the conical surface of the work, and means for moving said finishing members relative to said head and extending within said hollow spindle and operatively connected thereto for longitudinal movement effected by rotation of said spindle.

12. In a machine for the purpose described, the combination of a spindle, a head on the lower end of said spindle, a plurality of finishing members carried by said head, means extending transversely of and rotatable with said spindle for moving said finishing members longitudinally relative to said head in the direction of the length of their lines of contact with the work, and cam means having opposed undulating surfaces between which the end portions of said transverse means are engaged for reciprocating in both directions said means rotatable with said spindle, during rotation of said spindle.

13. In a machine as characterized in claim 12 and wherein said cam means includes a member surrounding said spindle and formed with an undulating surface, and said means rotatable with said spindle is provided with means for engagement with said undulating surface to impart reciprocation to said means rotatable with said spindle and said finishing members.

14. In a machine as characterized in claim 12 and wherein said spindle is tubular and said means rotatable with said spindle is a shaft reciprocable therein and said cam means includes a non-rotatable annular member having an undulating surface and said shaft is provided with a transverse member to engage said undulating surface and impart a uniform speed of reciprocation to said shaft.

15. The method of finishing the conical surface of a member, which method consists in rotating a finishing instrumentality about an axis coincident with the axis of said conical surface and in contact therewith transversely of said surface, simultaneously reciprocating said instrumentality transversely of said surface, and varying by means actuated by said rotation, the timed relation of said reciprocations to said rotations to vary the path of travel of said instrumentality during succeeding rotations.

16. The method of finishing the conical surface of a bearing member, which method consists in rotating a finishing instrumentality about the axis of the work with the work contacting surface of said instrumentality inclined to said axis of rotation in correspondence with the inclination of said conical surface, reciprocating said instrumentality transversely of said work surface engaged thereby, and varying the path of travel of said instrumentality laterally from its paths of reciprocation during succeeding rotations by rotating said reciprocating means relative to said rotating means and in timed relation thereto.

17. The method of finishing the conical surface of a bearing member, which method consists in rotating a finishing instrumentality in contact with said surface about the axis thereof, reciprocating said instrumentality transversely of said surface during rotation of said instrumentality, and imparting from said rotative movement to said reciprocating and rotating movements, a differential rotation to vary said instrumentality from its paths of reciprocation in contact with said surface during succeeding rotations.

18. Means for finishing circular conical surfaces, said means including a finishing member, means for rotating said member in contact at one side with said conical surface of the work and about the axis of said surface, means for reciprocating said member transversely of said surface during rotation of said member, and means driven by said rotating means for rotating said reciprocating means and said rotating means differentially.

19. Means for finishing circular conical surfaces, said means including a finishing member, driving means for rotating said member in contact at one side with said conical surface of the work and about the axis of said surface, means for reciprocating said member transversely of said surface during rotation of said member, said reciprocating means being rotatable with and relative to said driving means, and means actuated by said driving means for changing the position of said reciprocating means rotatively relative to said rotating means.

20. In a machine for the purpose described, the combination of a finishing member, means for rotating said member in contact with a conical surface of the work and about the axis of said surface, and means rotatable with said rotating means for moving said finishing member transversely of the conical work surface in contact therewith, said last named means including a cam and differential means driven by said rotating means for rotating said cam with a differential movement relative to the rotation of said rotating means.

21. In a device for the purpose described, a finishing member for engagement with an annular conical surface of work, a spindle for carrying said finishing member and rotating the same about the axis of the work in contact with the conical surface thereof, means for reciprocating said member transversely of the conical surface of the work and including an annular cam member, and differential means for imparting rotation to said cam member by the rotation of said spindle.

THOMAS ZIMMERMAN.